United States Patent
Shaked et al.

(10) Patent No.: US 12,271,490 B1
(45) Date of Patent: Apr. 8, 2025

(54) UNIFIED INSPECTION TECHNIQUES BASED ON ABSTRACTED COMPUTE TYPE

(71) Applicant: Wiz, Inc., New York, NY (US)

(72) Inventors: Yaniv Shaked, Tel Aviv (IL); Ami Luttwak, Binyamina (IL); Roy Reznik, Tel Aviv (IL); Yarin Miran, Rishon Lezion (IL); Moran Cohen, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/469,151

(22) Filed: Sep. 18, 2023

Related U.S. Application Data

(63) Continuation of application No. 17/804,923, filed on Jun. 1, 2022.

(Continued)

(51) Int. Cl.
| | | |
|---|---|---|
| *G06F 21/57* | (2013.01) | |
| *G06F 8/61* | (2018.01) | |
| *G06F 9/455* | (2018.01) | |
| *G06F 9/50* | (2006.01) | |
| *G06F 21/60* | (2013.01) | |

(52) U.S. Cl.
CPC ............. *G06F 21/577* (2013.01); *G06F 8/63* (2013.01); *G06F 9/45558* (2013.01); *G06F 9/5077* (2013.01); *G06F 21/602* (2013.01); *G06F 2009/4557* (2013.01); *G06F 2009/45595* (2013.01)

(58) Field of Classification Search
CPC ...... G06F 9/45558; G06F 9/5077; G06F 8/63; G06F 21/602; G06F 2009/4557; G06F 2009/45595; G06F 21/577
See application file for complete search history.

(56) References Cited

U.S. PATENT DOCUMENTS

| 1,062,837 A | 5/1913 | Mertz |
|---|---|---|
| 7,606,868 B1 | 10/2009 | Le et al. |

(Continued)

OTHER PUBLICATIONS

Girma et al., Analysis of Security Vulnerabilities of Cloud Computing Environment Service Models and Its Main Characteristics: 2015 12th International Conference on Information Technology—New Generations Year: 2015 | Conference Paper | Publisher: IEEE.

(Continued)

*Primary Examiner* — Jacob D Dascomb
(74) *Attorney, Agent, or Firm* — M&B IP Analysts, LLC

(57) ABSTRACT

A system and method for inspecting different types of cloud workloads for cybersecurity threats, all deployed in a cloud computing environment, includes a unifying extractor to expose different compute types to agnostic inspectors. The method includes accessing a first cloud workload of a first type from a plurality of deployed cloud workloads; accessing a second cloud workload of a second type from the plurality of deployed cloud workloads; extracting data from each of the first cloud workload and the second cloud workload into a storage layer having a data schema, based on a predefined data structure; and inspecting the extracted data to detect a first target object, the target object indicating a cybersecurity threat, wherein extraction for each of the first cloud workload and the second cloud workload is based on the workload type.

18 Claims, 7 Drawing Sheets

Related U.S. Application Data

(60) Provisional application No. 63/196,384, filed on Jun. 3, 2021.

(56) References Cited

U.S. PATENT DOCUMENTS

| | | | | |
|---|---|---|---|---|
| 9,203,862 | B1* | 12/2015 | Kashyap | G06F 21/552 |
| 9,916,321 | B2 | 3/2018 | Sundaram et al. | |
| 9,934,376 | B1* | 4/2018 | Ismael | G06F 21/566 |
| 9,940,330 | B2 | 4/2018 | Le et al. | |
| 9,961,098 | B2 | 5/2018 | Antony | |
| 10,601,807 | B2 | 3/2020 | Sweet et al. | |
| 10,649,863 | B2 | 5/2020 | Kumarasamy et al. | |
| 10,747,568 | B2 | 8/2020 | Ahmed | |
| 10,803,169 | B1* | 10/2020 | Flatten | H04L 63/1425 |
| 11,237,807 | B1 | 2/2022 | Rao et al. | |
| 11,409,611 | B2 | 8/2022 | Sancheti | |
| 11,431,735 | B2 | 8/2022 | Shua | |
| 2010/0138924 | A1* | 6/2010 | Heim | G06F 21/566 726/24 |
| 2016/0072817 | A1 | 3/2016 | Makhervaks et al. | |
| 2017/0109536 | A1* | 4/2017 | Stopel | G06F 21/577 |
| 2017/0345016 | A1 | 11/2017 | Meek et al. | |
| 2018/0324203 | A1 | 11/2018 | Estes et al. | |
| 2019/0042328 | A1 | 2/2019 | Ortega et al. | |
| 2019/0340167 | A1 | 11/2019 | Raman et al. | |
| 2020/0065487 | A1* | 2/2020 | Timashev | G06F 21/561 |
| 2020/0159933 | A1* | 5/2020 | Ciano | G06F 21/577 |
| 2020/0249928 | A1 | 8/2020 | Zeng et al. | |
| 2021/0208952 | A1 | 7/2021 | Jain et al. | |
| 2021/0255901 | A1 | 8/2021 | Hintermeister et al. | |
| 2021/0263802 | A1 | 8/2021 | Gottemukkula et al. | |
| 2022/0038544 | A1 | 2/2022 | Grinstein et al. | |

OTHER PUBLICATIONS

Kankhare et al., "A cloud based system to sense security vulnerabilities of web application in open-source private could IAAS," 2016 International Conference on Electrical, Electronics, Communication, Computer and Optimization Techniques (ICEECCOT) Year: 2016 | Conference Paper | Publisher: IEEE.

* cited by examiner

UNIFIED INSPECTION TECHNIQUES BASED ON ABSTRACTED COMPUTE TYPE

CROSS-REFERENCE TO RELATED APPLICATIONS

This application is a continuation of U.S. Non Provisional patent application Ser. No. 17/804,923 filed Jun. 1, 2022, which claims the benefit of U.S. Provisional Application No. 63/196,384 filed on Jun. 3, 2021, the contents of which are hereby incorporated by reference.

TECHNICAL FIELD

The present disclosure relates generally to detection of cybersecurity threats, and particularly to detecting a cybersecurity threat in multiple different virtual instance types with a single inspector.

BACKGROUND

As users migrate data storage, processing, and management tasks to decentralized, off-location devices, platforms, and services, the limitations of such devices, platforms, and services, also referred to as cloud environments, platforms, and the like, may impact a user's data operations. Specifically, vulnerabilities within cloud-deployed resources and processes may present unique challenges requiring remediation. Due to the scale and structure of cloud systems, detection of workload vulnerabilities, which detection may be readily-provided in non-cloud deployments, may require numerous, complex tools and operations.

Current solutions to cloud workload vulnerability scanning challenges require the deployment of specialized tools, including scanning agents directed to maintenance of virtual machines (VMs), where operation and maintenance of such tools may be costly, time-consuming, or both. Agent-dependent processes fail to provide for scanning of containers, such as containers managed using Kubernetes®, and other, like, container-management platforms, and may fail to provide for coverage of serverless applications. Where such agent-implementation processes fail to provide for full cloud workload vulnerability scanning, additional methods, such as snapshot-based scanning, may supplement implemented solutions.

Snapshot-based scanning, wherein static "snapshots" of processes, services, data, and the like, are analyzed in an environment separate from the source environment, provides for agentless scanning. Snapshot-based scanning is applied in various fields, including computer forensics, to provide for analysis of services, processes, data, and the like, in locations or environments other than those from which the snapshots are collected, as well as retrospective analysis.

However, the applicability of snapshot-based scanning is limited in multi-tenant systems, such as shared cloud platforms, as cloud tenants may desire high levels of data protection during snapshot generation, transfer, and analysis. Further, snapshot-based scanning methods, as well as hybrid methods including both agent-implemented and snapshot-based methods, may be inapplicable to certain cloud system structures and environments, which may include various objects, processes, and the like, which such methods may not be configured to process, as such processing may require, as examples, separate analysis of container repositories, VM snapshots, and application programming interfaces (API) for serverless applications, where existing solutions fail to provide such integrated functionality.

Furthermore, cloud workloads vary, and may be deployed as VMs, containers, serverless functions, and the like. VMs may be implemented, for example, as an Oracle® VirtualBox®. Containers may be implemented using a Kubernetes® engine, a Docker® engine, and the like. Serverless functions may be implemented as a Lambda® function. All these workloads have incompatible access, meaning that in order to use and access each, different commands and instructions need to be implemented. For scanning, each such cloud workload requires a different solution, each solution needs maintenance, and a large overhead is therefore incurred.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for inspecting different types of cloud workloads for cybersecurity threats. The method comprises: accessing a first cloud workload of a first type from a plurality of deployed cloud workloads; accessing a second cloud workload of a second type from the plurality of deployed cloud workloads; extracting data from each of the first cloud workload and the second cloud workload into a storage layer having a data schema, based on a predefined data structure; and inspecting the extracted data to detect a first target object, the target object indicating a cybersecurity threat, wherein extraction for each of the first cloud workload and the second cloud workload is based on the workload type.

Certain embodiments disclosed herein also include a non-transitory computer readable medium having stored thereon causing a processing circuitry to execute a process, the process comprising: accessing a first cloud workload of a first type from a plurality of deployed cloud workloads; accessing a second cloud workload of a second type from the plurality of deployed cloud workloads; extracting data from each of the first cloud workload and the second cloud workload into a storage layer having a data schema, based on a predefined data structure; and inspecting the extracted data to detect a first target object, the target object indicating a cybersecurity threat, wherein extraction for each of the first cloud workload and the second cloud workload is based on the workload type.

Certain embodiments disclosed herein also include a system for inspecting different types of cloud workloads for cybersecurity threats. The system comprises: a processing circuitry; and a memory, the memory containing instructions that, when executed by the processing circuitry, configure the system to: access a first cloud workload of a first type from a plurality of deployed cloud workloads; access a second cloud workload of a second type from the plurality of deployed cloud workloads; extract data from each of the first cloud workload and the second cloud workload into a storage layer having a data schema, based on a predefined data structure; and inspect the extracted data to detect a first target object, the target object indicating a cybersecurity threat, wherein extraction for each of the first cloud workload and the second cloud workload is based on the workload type.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
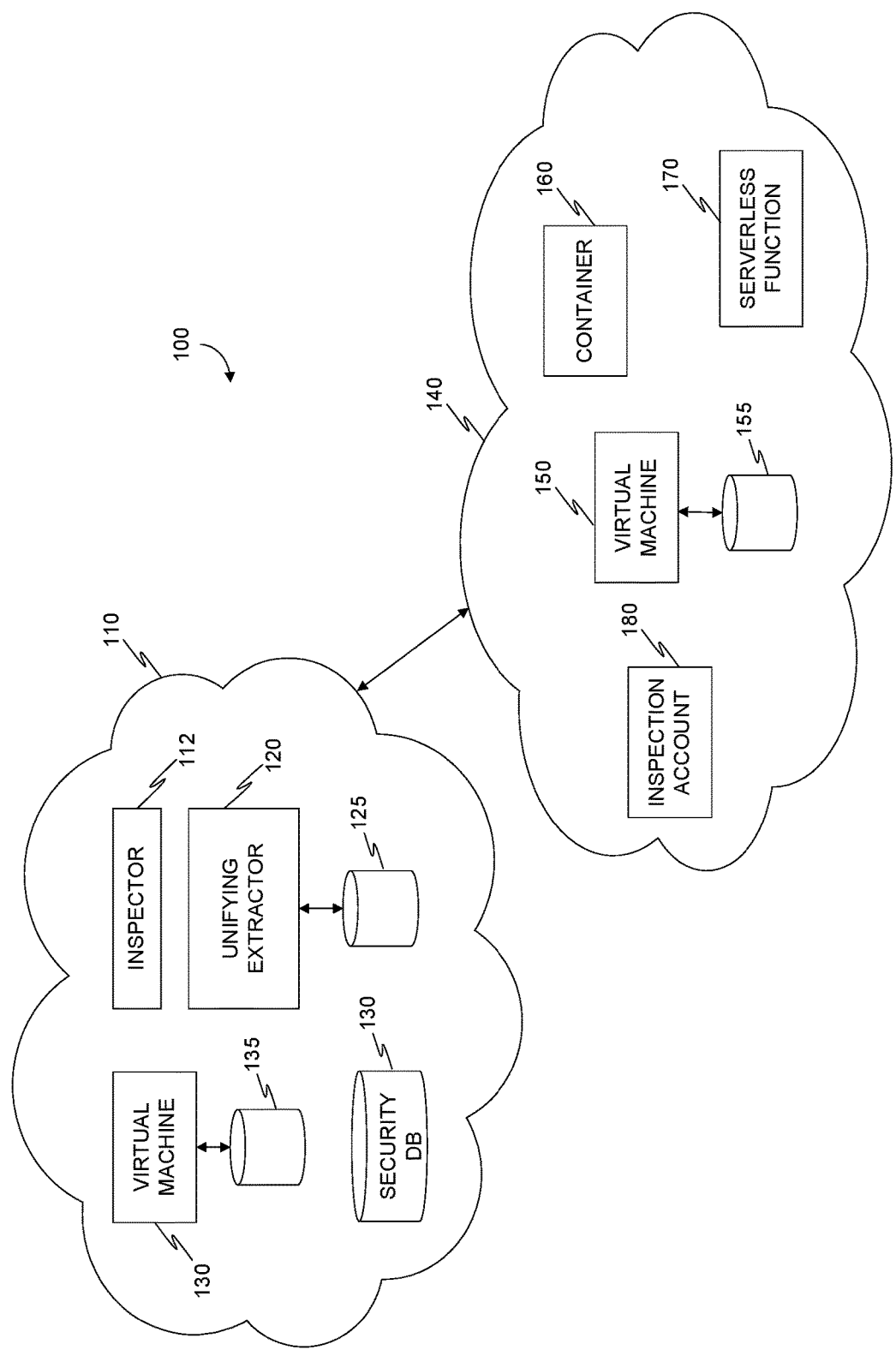
FIG. 1 is a diagram of a unifying extractor for cybersecurity inspection in a cloud computing environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for inspecting cloud workloads based on a unifying extractor to provide a single inspection environment. The disclosure teaches a unifying extractor which allows for utilizing an inspector on multiple different workload types, thus having the inspector agnostic to the workload type, and able to inspect for a target object (i.e., security object) across multiple workload types. The unifying extractor, therefore, decreases the number of different inspector types which need to be maintained and operated, leading to a more efficient computing environment.

FIG. 1 is an example diagram 100 of a unifying extractor 120 for cybersecurity inspection in a cloud computing environment, implemented in accordance with an embodiment. A cloud computing environment may be, for example, a virtual private cloud (VPC). The cloud computing environment is deployed on a cloud computing infrastructure. Examples of cloud computing infrastructures include Amazon® Web Services (AWS), Google® Cloud Platform (GCP), Microsoft® Azure, and the like.

An inspection environment 110, implemented as a cloud computing environment, includes a unifying extractor 120, and an inspector 112. The unifying extractor 120 is configured to expose data, applications, operating systems, and the like, for example by implementing the methods described in more detail herein. The inspector 112 is configured to inspect content received from, or generated by, the unifying extractor 120. In an embodiment, the inspector is configured to search for a security object, such as a folder name, a file name, a file type, a signature generated based on a file, a password, a certificate, a secret, a malware, and the like. For example, a signature may be generated for a file. The signature may be compared to another signature, wherein the another signature is indicative of a cybersecurity threat, vulnerability, exposure, and the like. Where a match occurs between the generated signature and the another signature, the file, and by association the cloud workload associated with the file, is considered to have a cybersecurity vulnerability.

The inspection environment 110 further includes a security database 130. In an embodiment, the security database 130 is configured to store thereon a security graph. A security graph is a representation of a cloud computing environment, such as production environment 140 (discussed in more detail below). In certain embodiments, cloud entities, such as cloud workloads, components thereof, enrichments, and the like, may be stored as respective nodes in the security graph, such that each node corresponds to a cloud entity. The nodes may be connected by edges indicating a relationship between the nodes.

A production environment 140 is a cloud computing environment which provides services and resources to user accounts, user devices, etc. The production environment 140 is distinguished in an organization from a testing environment (not shown) in which applications, appliances, functions, code, and the like may be tested before entering the production environment 140. The production environment 140 includes various cloud workloads, such as a virtual machine (VM) 150, a container 160, and a serverless function 170. The VM 150 may be implemented, for example, as an Oracle® VirtualBox®. The container 160 may be implemented using a Kubernetes® engine, a Docker® engine, and the like. The serverless function 170 may be implemented as a Lambda® function. It should be apparent that a production environment may include therein any one of the cloud workloads mentioned above.

In certain embodiments, the production environment 140 further includes principals, which are cloud entities that are authorized to initiate actions in the production environment, and are authorized to access a resource of the production environment 140. A principal may be, for example, a user account, a service account, a role, and the like. In an embodiment, the production environment includes an inspection account 180, which may be implemented as a service account. The inspection account 180 is configured to access cloud workloads, for example, by receiving permissions, privileges, and the like. The inspection account 180 may be configured to initiate an action in the cloud environment to provide a cloud workload for inspection by the inspection environment 110. In an embodiment where an inspection account 180 is implemented, the inspection environment 110 may be referenced using a first context (inspection environment context) and a second context (production environment context), where each context is differentiated, for example by user access permissions.

The production environment 140 includes a VM 150, which is connected to a disk 155. In an embodiment, a VM 150 is connected to a disk 155 by provisioning storage resources from the cloud environment (e.g., the production environment 140) to the VM 150, which includes a descriptor, pointing to an address of the provisioned (or allocated) storage.

In an embodiment, inspecting the VM 150 includes generating a snapshot of the disk 155. In an embodiment, the snapshot may be mounted as a disk 135 of an inspection VM 130 which is deployed in the inspection environment 110.

In some embodiments, the unifying extractor 120 is provisioned a first disk 125, onto which data, extracted from a cloud workload is loaded. The inspector 112 may inspect the first disk 125 for security objects. While a single inspector 112 is shown here, it is readily apparent that a plurality of inspectors may be utilized. For example, inspectors of different object types may be utilized, such that a first type of inspector inspects for a first type of object (e.g., malware), and a second type of inspector inspects for a second type of object (e.g., certificates).

In an embodiment, the unifying extractor 120 is further communicatively connected with a virtual machine 130. The virtual machine 130 mounts the disk 135 which is generated based off of a snapshot of the disk 155 of the production environment 140. In an embodiment, the unifying extractor 120 is configured to extract data, data objects, code, files, folders, and the like from the disk 135 and provide the extracted data to an inspector 112. Providing the data to the inspector 112 may include, in an embodiment, storing the extracted data in the disk 125 of the unifying extractor 120.

In certain embodiments, an inspector is configured to detect a security object from the extracted data. The security objects may be represented in a security graph, for example stored on the security database 130, which further includes a representation of the production environment 140. For example, a security object may be represented as a node, which is connected to another node representing a disk on which the security object was found (following inspection of the disk), and the another node is connected to a machine node, which represents the VM which is allocated the disk.

Figure 2:
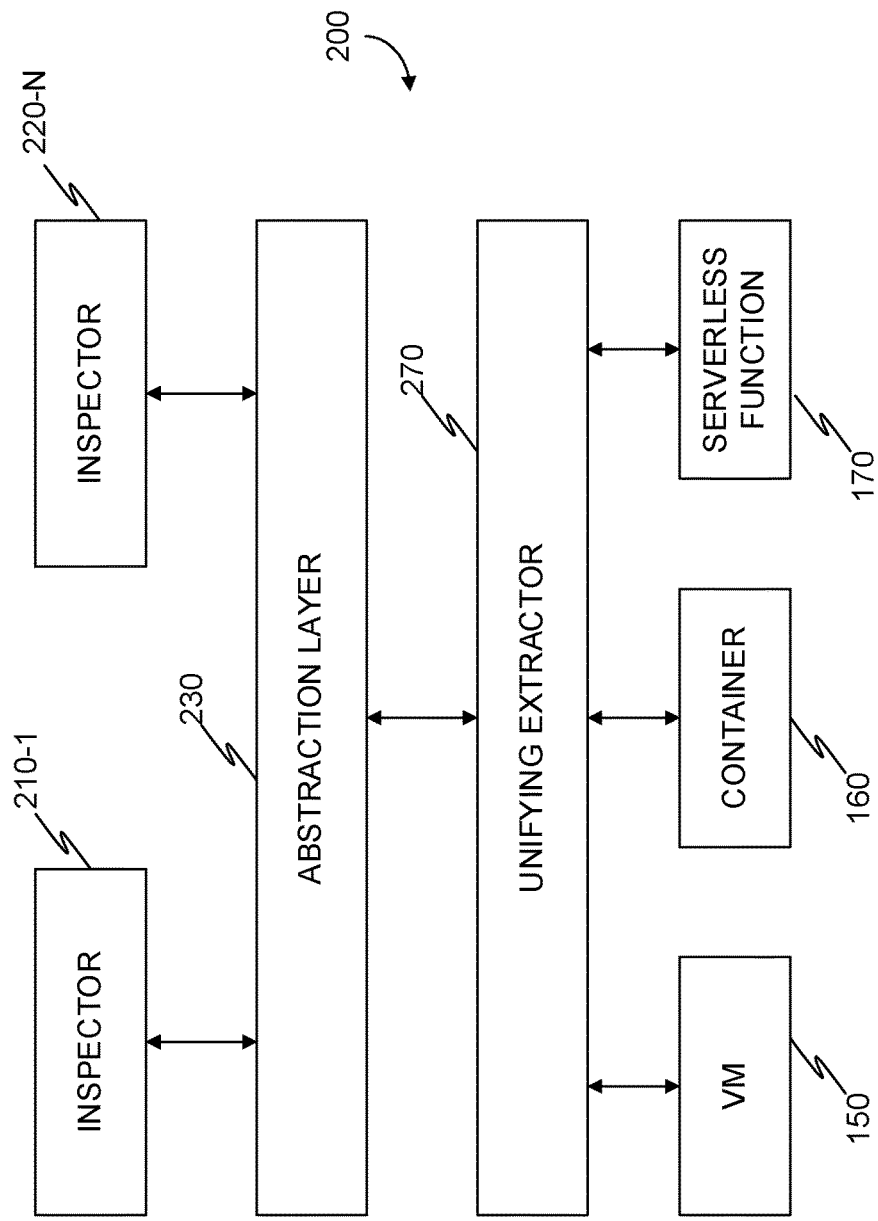
FIG. 2 is a schematic illustration of an abstraction layer for inspecting cloud workloads, implemented in accordance with an embodiment.

FIG. 2 is a schematic illustration 200 of an abstraction layer for inspecting cloud workloads, implemented in accordance with an embodiment.

A unifying extractor 270 (or simply 'extractor 270') is configured to extract data from a cloud workload into an abstraction layer 230. In some embodiments, a plurality of extractors may be utilized, each extractor configured to extract data from a different type of cloud workload. For example, a first extractor may extract data from virtual machines, a second extractor may extract data from software containers, etc.

In an embodiment, the abstraction layer 230 includes multiple files, folders, objects, and the like, stored on a storage of a cloud workload. In certain embodiments, the abstraction layer 230 includes a data structure, which includes a predefined data schema. In some embodiments the abstraction layer 230 includes a data structure defined by a data schema, and a storage allocated from an inspection environment, into which data is stored based on the data structure. For example, the predefined data schema may define where, and how, certain objects are stored in the abstraction layer. The predefined data schema may define that an object of a first type is stored in a folder, the folder having a generated name (or other identifiers) according to a rule, and a second type of object is stored as a file in a different folder. As another example, data objects pertaining to an operating system may be stored in a folder having an 'OS' prefix in the folder name (or identifier). This allows, for example, storing operating system data using a single structure, whether the operating system is deployed for a virtual machine or for a container engine.

A plurality of inspectors, such as first inspector 210-1 and second inspector 220-N, generally referenced as plurality of inspectors 210, are configured to detect security objects. In an embodiment, 'N' is an integer having a value of '2' or greater. Security objects may be, for example, computer files, such as text files, registry files, and the like. Each inspector may be configured to inspect for different data (or data objects). Rather than directly inspect a cloud workload, the plurality of inspectors inspect data which is stored in the abstraction layer 230.

In an embodiment, the first inspector 210 is configured to detect secrets (such as hashes, cryptographic keys, certificates, and the like), libraries, registry keys, metadata, etc. For example, the first inspector 210 may receive as an input a text file, and output any cryptographic key stored therein. In certain embodiments, the second inspector 220 is configured to inspect system files and directories. Each inspector may inspect for one or more target objects, i.e., a data object which the inspector is attempting to locate. In an embodiment, presence of a target object in a cloud workload may indicate a security vulnerability.

For example, a virtual machine 140, a software container 150, and a serverless function 160 are accessed by a unifying extractor 270. The unifying extractor 270 extracts data from each cloud workload (i.e., the VM 140, container 150, and serverless function 160) and stores the extracted data in the abstraction layer 230. In an embodiment, the extractor 270 may further store an identifier of each cloud workload with the respective extracted data to indicate where the extracted data originated from. An inspector, such as first inspector 210, may then access the abstraction layer 230 to detect target objects therein.

By making the extracted data available to the inspectors at the abstraction layer 230, the inspectors are agnostic to the type of workload. Thus, rather than have a first inspector which scans a first type of workload for a first type of object, a second inspector which inspects a second type of workload for the first type of object and so on, a single inspector may be utilized, allowing the inspector to effectively inspect any workload by utilizing the abstraction layer 230.

It should be noted that virtual machines (140), software containers (150), and serverless functions (160) are only examples for cloud workloads and the disclosed embodiments may be applicable to any other types of workloads or computing instances deployed in a cloud computing environment. It should be further noted that the inspectors 210, 220, and the unifying extractor 270 can be realized in hardware, firmware, software or combination thereof. When realized in hardware, these elements may be realized as one or more hardware logic components and circuits, examples of which are provided below.

Figure 3:
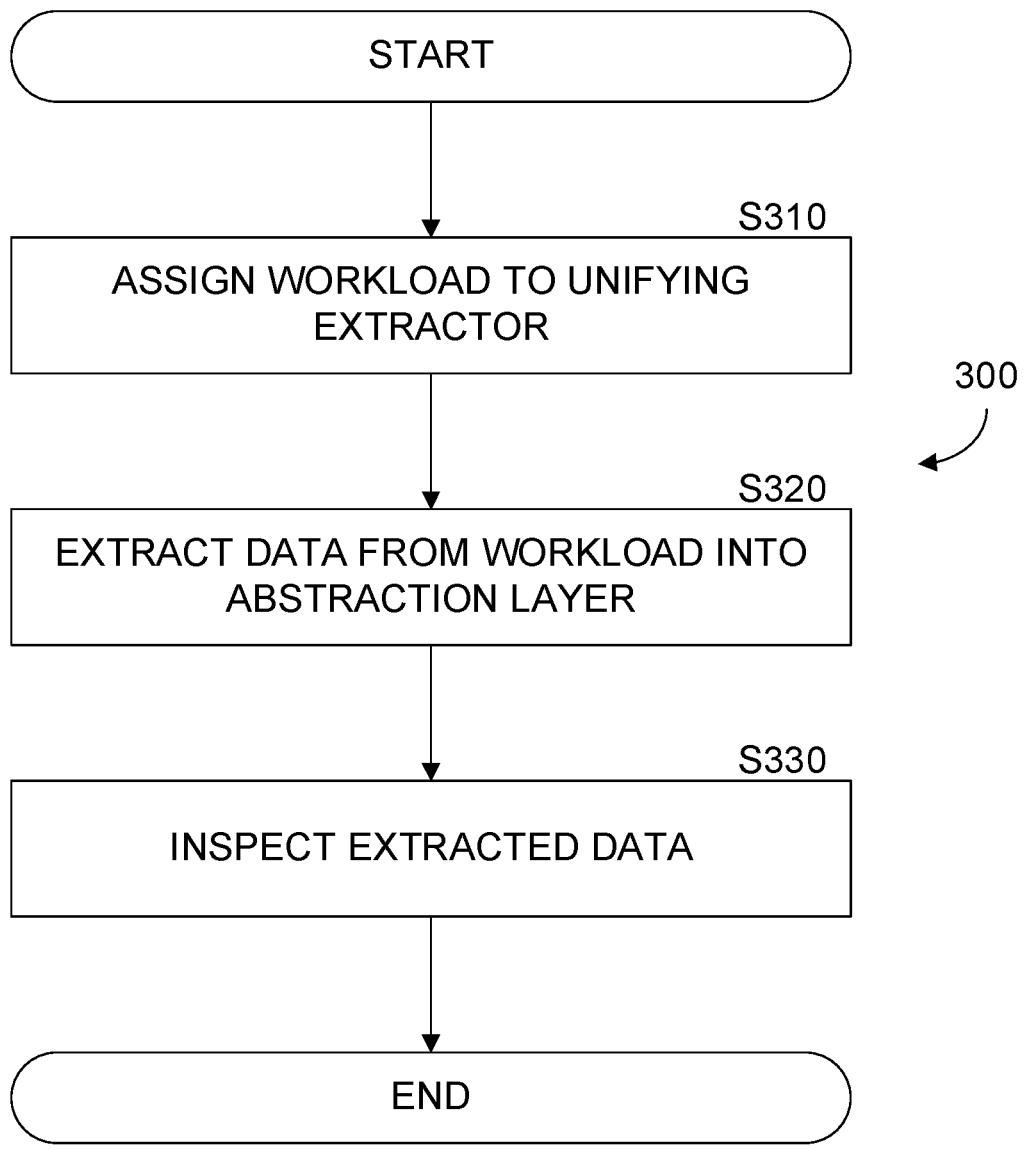
FIG. 3 is a flowchart of a method for improving detection of vulnerabilities in cloud workload deployed in a cloud computing environment, implemented according to an embodiment.

FIG. 3 is an example flowchart 300 of a method for improving detection of vulnerabilities in cloud workload deployed in a cloud computing environment, implemented according to an embodiment. The method may be performed by a unifying extractor.

At S310, a cloud workload is assigned to a unifying extractor. In certain embodiments, the unifying extractor (or simply 'extractor') may be configured to select a cloud workload, for example, from a list of cloud workload identifiers. A cloud workload may be, for example, a software container (such as a Kubernetes® software container), a virtual machine, a serverless function, and the like. A virtual machine shares hardware resources with other virtual machines, while a software container shares hardware resources and an operating system with other software containers. A serverless function is a program (i.e., computer code) hosted on a managed infrastructure, such as a cloud computing infrastructure of a cloud computing environment. AWS® Lambada is an example of a serverless function implementation. In an embodiment, the extractor is configured to receive an assigned workload by an orchestrator machine of the cloud computing environment. An advantage of utilizing the teachings herein is that by providing a native cloud-based solution for inspecting workloads, inspection is performed rapidly due to low latency. This is especially important in cloud computing environments where virtual workloads are spun up and down rapidly to support customer demand.

At S320, data is extracted from the workload. In an embodiment, the extracted data is stored in an abstraction layer. An abstraction layer may include a data structure, based on a data schema, and an allocated storage. For example, the extracted data may be stored as files in a depository, which is configured to be an abstraction layer.

In an embodiment, a plurality of extractors may be utilized, each extractor configured to extract data from a different type of cloud workload. For example, a first extractor may extract data from virtual machines, a second extractor may extract data from software containers, etc. In certain embodiments, an abstraction layer includes multiple files, folders, objects, and the like, stored on a storage of a cloud workload.

In some embodiments, the abstraction layer includes a data structure, which includes a predefined data schema. In certain embodiments, the abstraction layer includes a data structure defined by a data schema, and a storage allocated from an inspection environment, into which data is stored based on the data structure.

For example, the predefined data schema may define where, and how, certain objects are stored in the abstraction layer. The predefined data schema may define that an object of a first type is stored in a folder, the folder having a generated name (or other identifiers) according to a rule, and a second type of object is stored as a file in a different folder.

As another example, data objects pertaining to an operating system may be stored in a folder having an 'OS' prefix in the folder name (or identifier). This allows, for example, storing operating system data using a single structure, whether the operating system is deployed for a virtual machine or for a container engine.

At S330, the extracted data is inspected. In an embodiment, the extracted data may be inspected by a plurality of inspectors. Each inspector inspects for a target object. Such objects may include registry keys, encryption keys, certificates, secrets, libraries, and the like. In certain embodiments, an inspector is configured to detect a security object from the extracted data. The security object may be represented in a security graph, for example, stored on a security database, which further includes a representation of a production environment in which the cloud workload is deployed. For example, a security object may be represented as a node, which is connected to another node representing a disk on which the security object was found (following inspection of the disk), and the another node is connected to a machine node, which represents, e.g., the VM which is allocated the disk.

Utilizing a unifying extractor to extract data from workloads and store the data in an abstraction layer allows for reducing compute resources from an inspection environment, as an inspector is not required to handle various different workloads in addition to being configured to inspect for certain target objects. For example, rather than deploy three different inspectors to each compute type (e.g., VM, container, serverless function) to inspect for the same object, a single inspector type is deployed, which utilizes the unified extractor. Furthermore, as target objects are constantly changing with new protocols being implemented, there is no requirement to update each inspector for each type of workload, rather a single update to an inspector may be sufficient. For example, when a new type of malware is detected, there is no need to update three different inspectors (i.e., one for VMs, one for containers, and one for serverless functions) but rather update a single inspector which inspects for that detected malware.

Figure 4:
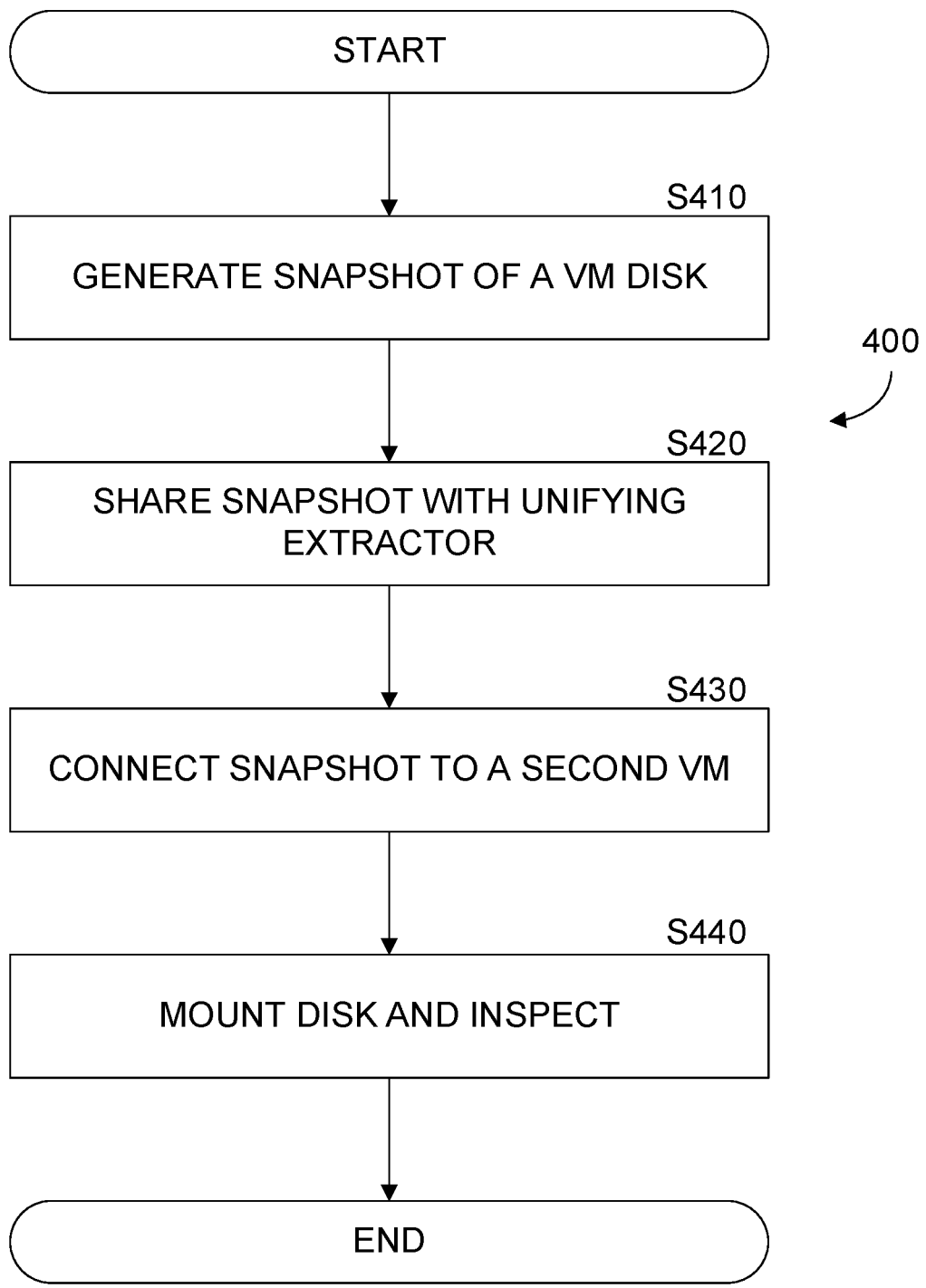
FIG. 4 is a flowchart of a method for extracting data from a virtual machine, utilizing a unifying extractor, implemented in accordance with an embodiment.

FIG. 4 is an example flowchart 400 of a method for extracting data from a virtual machine, utilizing a unifying extractor, implemented in accordance with an embodiment.

At S410, a snapshot is generated of a disk of a virtual machine. In certain embodiments, where the virtual machine is connected with a single disk, a snapshot is generated of the single disk. In some embodiments where multiple disks are present, the extractor is configured to determine which disk should be used for generating a snapshot. For example, a disk of interest will typically have a "/dev/sda" directory in both Windows® and Linux® operating systems.

In certain embodiments, the disk may be encrypted. In order to extract data, the unifying extractor requires access to a decryption key. In an embodiment, a master key may be generated with access granted to the unifying extractor. For example, in the AWS® cloud environment a Customer Master Key (CMK) may be generated. The CMK includes metadata, such as the key ID, creation date, description, and key state. The CMK also includes the key material used to encrypt and decrypt data. A snapshot copy may then be generated and re-encrypted, which will result in generation of a new snapshot which is encrypted with a key the unifying extractor now has access to.

In other embodiments, a policy of the encryption key may be updated to include access for the unifying extractor.

At S420, the generated snapshot is shared with a unifying extractor. In an embodiment where the disk is not encrypted, the (original) generated snapshot is shared with the unifying extractor. In an embodiment where the disk is encrypted, the original generated snapshot is shared with the unifying extractor when a policy modification, allowing the unifying extractor access to the encryption key, is provided.

In certain embodiments, the disk is encrypted, and the unifying extractor does not have access to the encryption key, making decryption (and therefore extraction of data) not possible. In such embodiments, a new snapshot is generated based on a re-encryption using a master key. In certain embodiments, the unifying extractor may be deployed in a first cloud environment (e.g., inspection environment), and the cloud workloads deployed in a second environment (e.g., production environment). In such embodiments, once a snapshot is shared with (or copied to the environment of) the unifying extractor, a corresponding snapshot may be deleted from the second environment. Deletion may be performed in response to creating a disk from the snapshot in the first environment.

At S430 a disk is generated based on the snapshot. In an embodiment, the disk is connected with a virtual machine configured to communicate with the unifying extractor and to allow the unifying extractor access to the disk. In an embodiment, the virtual machine is in the same cloud computing environment in which the unifying extractor is deployed. In certain embodiments, the unifying extractor may be configured to directly access the disk. For example, the unifying extractor may be configured to read a disk descriptor associated with the disk, dereference a pointer of the disk which points to a physical storage address of the cloud computing environment, and access the storage to read the contents stored therein.

At S440 the disk is mounted. In an embodiment, an inspector may be configured to begin inspection at a mount point of the mounted disk. In some embodiments, the method may be performed for each disk of a plurality of disks of a cloud workload.

Figure 5:
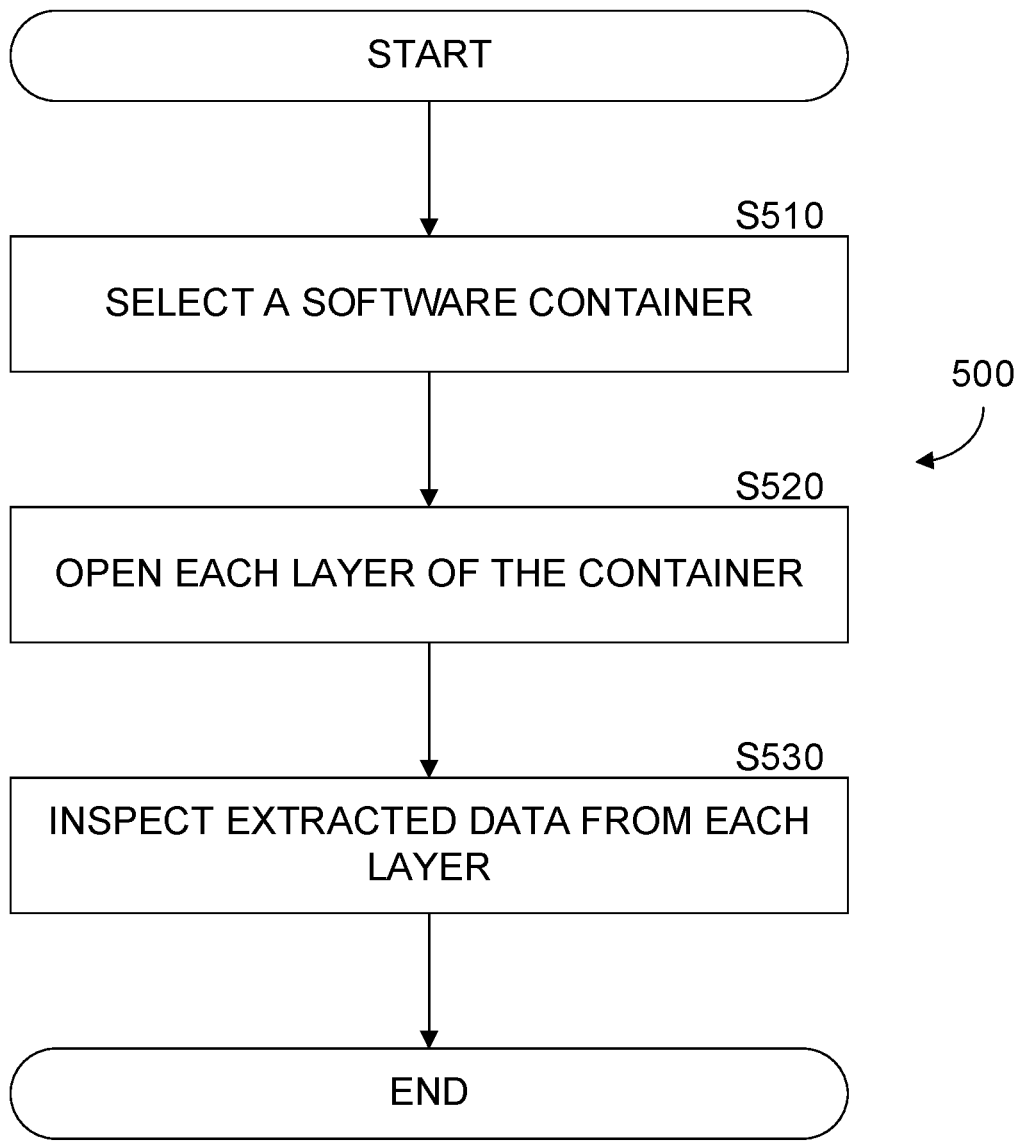
FIG. 5 is a flowchart of a method for inspecting a software container deployed in a cloud computing environment, by extracting data utilizing a unifying extractor, implemented in accordance with an embodiment.

FIG. 5 is an example flowchart 500 of a method for inspecting a software container deployed in a cloud computing environment by extracting data utilizing a unifying extractor, and implemented in accordance with an embodiment. In an embodiment, the method is performed by a unifying extractor.

At S510, a software container (or simply 'container') deployed in a cloud computing environment is selected. In some embodiments, a container is selected by accessing a container image repository. An image file is accessed from the container image repository, from which the deployed container is deployed. A second container, which is not the container deployed in the cloud computing environment, is generated from the image file. The contents of the image file may then be written (or dumped) to a disk in a cloud computing environment of the unifying extractor.

In certain embodiments, a container may be detected on a virtual machine. For example, an inspector may be configured to detect containers (e.g., detect files which indicate that a machine has container software installed thereon). In an embodiment an inspector is configured to detect a container on a disk of a virtual machine. The inspector may detect, for example, a file including data describing the container, and layers of which the container is comprised. A container may include an image of a read/write layer on top of a plurality of read only layers. Each read-only layer is generated based on one or more commands executed during the container image build. A layer may be stored as a file.

At S520, each layer of the software container is opened. In an embodiment, each layer is accessed (i.e., opened) according to order. A container will typically contain a plurality of layers. The top layer (i.e., the first layer which is accessible) is a read/write layer underneath which there may be a plurality of read-only layers. In an embodiment, opening a container includes accessing a first layer, extracting all data stored in the first layer, accessing a next layer, extracting all data stored in the next layer, and so on, until all layers are opened.

At S530, the container layers are inspected. The container layers may each include extracted data. In an embodiment, data is extracted from each layer into a disk of an abstraction layer. For example, the extracted data may be stored in the abstraction layer based on a predefined data schema. The stored extracted data may be accessed by an inspector which inspects the extracted data for a target object.

Figure 6:
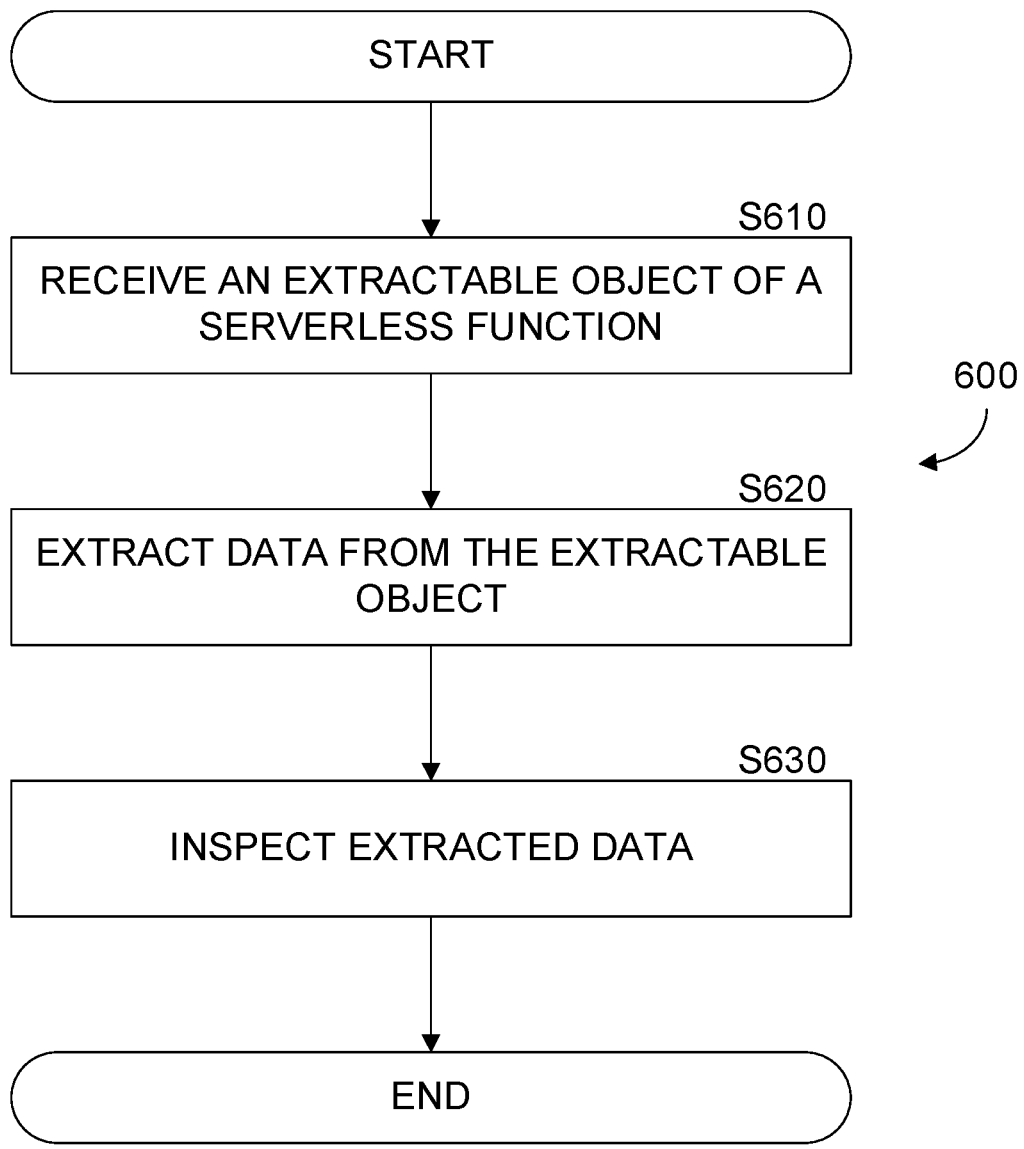
FIG. 6 is a flowchart of a method for inspecting a serverless function by extracting data utilizing a unifying extractor, implemented in accordance with an embodiment.

FIG. 6. is an example flowchart 600 of a method for inspecting a serverless function by extracting data utilizing a unifying extractor, implemented in accordance with an embodiment.

At S610, an extractable object of a serverless function is received. In an embodiment, a unifying extractor may be configured to generate a request which is sent to an orchestrator of a cloud computing environment in which the serverless function is deployed, for an extractable object of the serverless function. The request, when executed by the orchestrator, configures the orchestrator to provide access to the extractable object of the serverless function. In an embodiment, the extracted object is a compressed file, such as a ZIP type file. The extracted object may include, for example, computer code, a text file, and the like.

At S620, data is extracted from the extractable object. In an embodiment, data is extracted from a compressed file. This process is also referred to as decompressing. The extracted data may be, for example, computer code, including code objects, software libraries, binaries, and the like.

At S630, the extracted data is inspected. The extracted data may include textual files, computer code, and so on. In an embodiment, data is extracted from a compressed file into a disk of an abstraction layer. For example, the extracted data may be stored in the abstraction layer based on a predefined data schema. The stored extracted data may be accessed by an inspector which inspects the extracted data for a target object.

Figure 7:
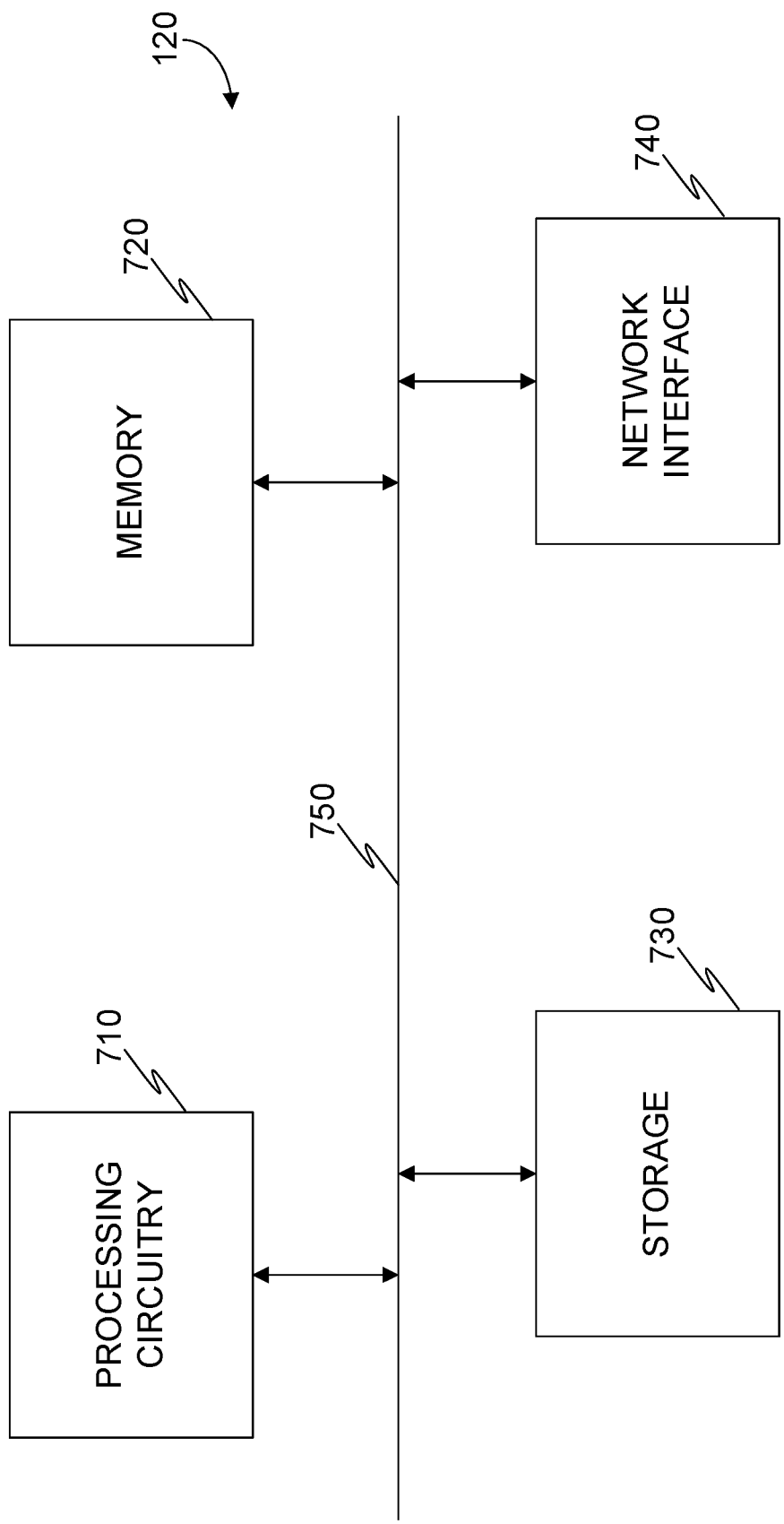
FIG. 7 is a schematic diagram of a unifying extractor according to an embodiment.

FIG. 7 is an example schematic diagram of a unifying extractor 120 (or simply 'extractor 120') according to an embodiment. The extractor 120 includes a processing circuitry 710 coupled to a memory 720, a storage 730, and a network interface 740. In an embodiment, the components of the extractor 120 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 710 to perform the various processes described herein.

The storage 730 may be magnetic storage, optical storage, and the like, and may be realized, for example, as flash memory or other memory technology, or any other medium which can be used to store the desired information. In an embodiment, the storage 730 may be used to implement the abstraction layer 230, by storing extracted data thereon.

The network interface 740 allows the extractor 120 to communicate with, for example, an abstraction layer 230, a plurality of inspectors, and cloud workloads, such as virtual machines, containers, serverless functions, and the like.

It should be understood that the embodiments described herein are not limited to the specific architecture illustrated in FIG. 7, and other architectures may be equally used without departing from the scope of the disclosed embodiments. Likewise, other elements may be deployed using similar architecture, for example, the first inspector 210, second inspector 220, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inspecting a cloud computing environment deployed on a cloud computing infrastructure for a cybersecurity threat, comprising:
   detecting, by an inspection account configured to access a cloud computing environment, the cloud computing environment including a plurality of workloads, a first workload of the plurality of workloads, the first workload being a container that includes a plurality of software layers;
   extracting data from each of at least a first layer and a second layer into a single inspection environment based on a predefined schema;
   inspecting, by a first inspector, the extracted data of the first layer of-the first workload for a first cybersecurity object on a first layer of the plurality of software layers;
   inspecting, by a second inspector, the extracted data of the second layer of the first workload for a second cybersecurity object on a second layer of the plurality of software layers; and
   detecting a cybersecurity threat based on detecting the first cybersecurity object and the second cybersecurity object.

2. The method of claim 1, further comprising:
   generating a representation of the cloud computing environment in a security database, the representation including a representation of a resource and a representation of a principal; and
   updating the representation with a representation of a detected first cybersecurity object.

3. The method of claim 2, further comprising:
   representing the detected first cybersecurity object as a node in a security graph stored on the security database.

4. The method of claim 1, further comprising:
   provisioning, for the inspection account, a storage allocation for mounting a disk, the disk associated with the first workload;
   mounting the disk in the provisioned storage allocation; and
   inspecting the mounted disk for the first cybersecurity object.

5. The method of claim 4, further comprising:
   releasing the storage allocation in response to completing inspection.

6. The method of claim 1, wherein the first layer includes an operating system.

7. The method of claim 1, wherein the second layer includes an application.

8. The method of claim 1, wherein the single inspection environment is a disk of an abstraction layer.

9. A non-transitory computer-readable medium storing a set of instructions for inspecting a cloud computing environment deployed on a cloud computing infrastructure for a cybersecurity threat, the set of instructions comprising:
   one or more instructions that, when executed by one or more processors of a device, cause the device to:
      detect, by an inspection account configured to access a cloud computing environment, the cloud computing environment including a plurality of workloads, a first workload of the plurality of workloads, the first workload being a container that includes a plurality of software layers;
      extract data from each of at least a first layer and a second layer into a single inspection environment based on a predefined schema;
      inspect, by a first inspector, the extracted data of the first layer of the first workload for a first cybersecurity object on a first layer of the plurality of software layers;
      inspect, by a second inspector, the extracted data of the second layer of the first workload for a second cybersecurity object on a second layer of the plurality of software layers; and detect a cybersecurity threat based on detecting the first cybersecurity object and the second cybersecurity object.

10. The non-transitory computer-readable medium of claim 9, wherein the single inspection environment is a disk of an abstraction layer.

11. A system for inspecting a cloud computing environment deployed on a cloud computing infrastructure for a cybersecurity threat comprising: a processing circuitry; and a memory, the memory containing instructions that, when executed by the processing circuitry, configure the system to:

detect, by an inspection account configured to access a cloud computing environment, the cloud computing environment including a plurality of workloads, a first workload of the plurality of workloads, the first workload being a container that includes a plurality of software layers;

extract data from each of at least a first layer and a second layer into a single inspection environment based on a predefined schema;

inspect, by a first inspector, the extracted data of the first layer of the first workload for a first cybersecurity object on a first layer of the plurality of software layers;

inspect, by a second inspector, the extracted data of the second layer of the first workload for a second cybersecurity object on a second layer of the plurality of software layers; and detect a cybersecurity threat based on detecting the first cybersecurity object and the second cybersecurity object.

12. The system of claim 11, wherein the memory contains further instructions which when executed by the processing circuitry further configure the system to:

generate a representation in a security database of the cloud computing environment; and update the representation with a representation of a detected first cybersecurity object.

13. The system of claim 12, wherein the memory contains further instructions which when executed by the processing circuitry further configure the system to:

represent the detected first cybersecurity object as a node in a security graph stored on the security database.

14. The system of claim 11, wherein the memory contains further instructions which when executed by the processing circuitry further configure the system to:

provision, for the inspection account, a storage allocation for mounting a disk, the disk associated with the first workload; and inspect the mounted disk for the first cybersecurity object.

15. The system of claim 14, wherein the memory contains further instructions which when executed by the processing circuitry further configure the system to:

release the storage allocation in response to completing inspection.

16. The system of claim 11, wherein the first layer includes an operating system.

17. The system of claim 11, wherein the second layer includes an application.

18. The system of claim 11, wherein the single inspection environment is a disk of an abstraction layer.

* * * * *